(No Model.) 8 Sheets—Sheet 1.

R. McCULLY.
CRUSHING AND PULVERIZING MACHINE.

No. 463,538. Patented Nov. 17, 1891.

WITNESSES:

INVENTOR
Robert McCully
By S. J. Van Stavoren
ATTORNEY

(No Model.) 8 Sheets—Sheet 2.

R. McCULLY.
CRUSHING AND PULVERIZING MACHINE.

No. 463,538. Patented Nov. 17, 1891.

WITNESSES: INVENTOR
Robert McCully
By S. J. VanStavern
ATTORNEY

(No Model.) 8 Sheets—Sheet 5.

R. McCULLY.
CRUSHING AND PULVERIZING MACHINE.

No. 463,538. Patented Nov. 17, 1891.

(No Model.) 8 Sheets—Sheet 8.

R. McCULLY.
CRUSHING AND PULVERIZING MACHINE.

No. 463,538. Patented Nov. 17, 1891.

UNITED STATES PATENT OFFICE.

ROBERT McCULLY, OF PHILADELPHIA, PENNSYLVANIA.

CRUSHING AND PULVERIZING MACHINE.

SPECIFICATION forming part of Letters Patent No. 463,538, dated November 17, 1891.

Application filed December 1, 1886. Serial No. 220,329. (No model.)

*To all whom it may concern:*

Be it known that I, ROBERT McCULLY, a citizen of the United States, residing at Philadelphia, in the county of Philadelphia and State of Pennsylvania, have invented certain new and useful Improvements in Crushing and Pulverizing Machines, of which the following is a specification, reference being had therein to the accompanying drawings, wherein—

Figs. 10 and 11 are like views showing the same results when the fulcrum or journal has a direct bearing in the top frame of the machine, the sleeve being dispensed with.

Figures 1, 2, 3:
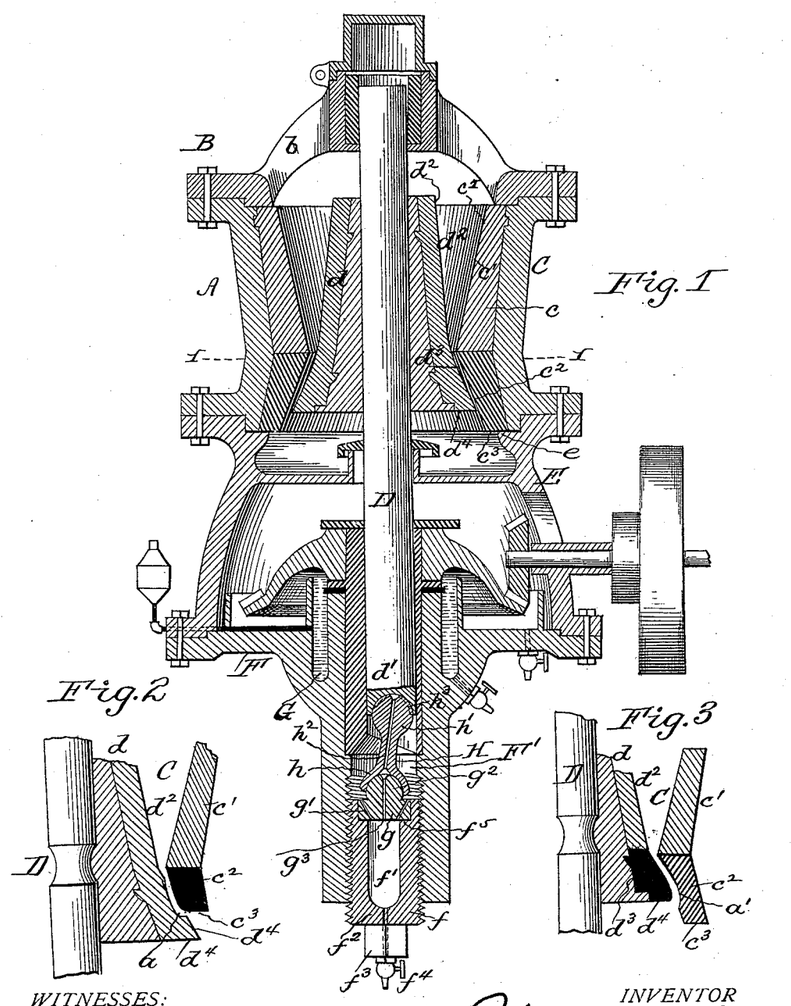
Figure 1 is a transverse vertical section of a crushing-machine embodying my improvements, showing the crusher-head in position within the crushing-chamber or adjusted to produce fine crushing or work.
Fig. 2 is a section of part of gyratory shaft, crusher-head, and crushing-chamber as heretofore constructed and arranged for operation, showing a bench or ledge formed on the lower tapered part of the crusher-head by its wear, which bench or ledge retains on it the crushed material and tends to clog the machine and prevent free discharge from the crushing-chamber.
Fig. 3 is a like view, showing the result of the wear on the crushing-surfaces in a machine embodying my improvements, and that said wear falls mostly upon the lower part of the crushing-chamber working faces and does not form a bench or ledge to clog the machine or interfere with the free exit of the crushed material from the crushing-chamber.

My invention has relation to that form of crushing-machines for ore or other material wherein is used a gyratory crusher-head and a crushing-chamber having reversely-tapered working faces for effecting a coarse breaking or crushing of the ore and a successive finer crushing of any desired degree of fineness within the capacity of the machine. Heretofore these reversely-tapered working faces of the crushing-chamber and crusher-head have been usually so constructed and the crusher-head so arranged in relation to the working faces of the crusher-chamber that when the crusher-head is adjusted for doing either coarse or fine work a portion of its lower tapered part is located below the bottom edge of the working faces of the crushing-chamber, as shown in Fig. 2 of the drawings. I have found by practical experience that this described construction and arrangement results in the formation of annular benches, ledges, or recesses in the lower tapered part of the crusher-head, as shown at *a* in said figure, which ledges or recesses form a resting-place or lodgment for the material passing through the machine, which material accumulates on said ledges or recesses and clogs and impedes or obstructs its free exit from the crushing-chamber. The formation of these benches on the crusher-head makes it wear unevenly and it discharges from the bench instead of from its bottom edge.

One of the objects of my invention is to avoid the formation of these annular benches or ledges in or upon the lower tapered part of the crusher-head, so that the material passing through the machine has unobstructed exit from and does not clog the machine and the crusher-head wears evenly and discharges from its bottom edge. To accomplish this desired result I so construct the crushing-chamber and the crusher-head working faces and so adjust the crusher-head that when set for doing its coarsest work its lower edge or bottom is on a line with or above the lower edge or bottom of the crushing-chamber working faces, and when adjusted to do fine work its lower edge is raised in the crushing-chamber—that is to say, the bottom edge of the crushing-chamber working faces is never above that of the crusher-head. The wear between said parts in this last-described arrangement of the working faces of the crusher-head and of the crushing-chamber produces a recess in the lower tapered part of the crushing-chamber working faces, as shown in Fig. 3; but as the taper of this part flares downwardly or diverges from above downwardly the recess or recesses worn therein conform more or less to said flare, and no bench or ledge is formed in said part to retain the material passing through the machine, and such material therefore has free exit from and does not tend to clog the machine and the crusher-head wears evenly and discharges from its bottom edge.

Figure 13:
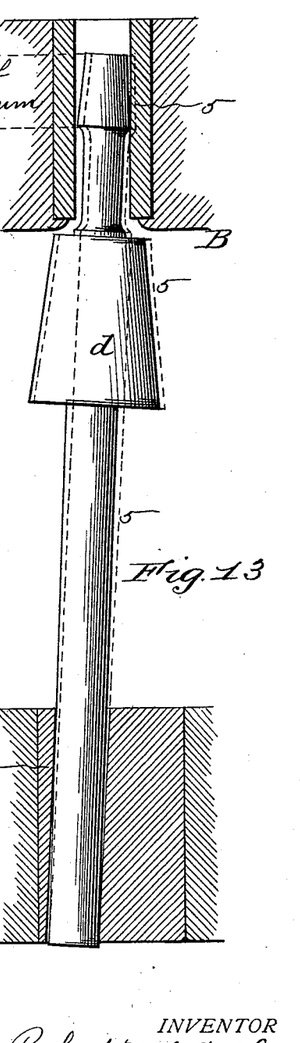
Figure 14:
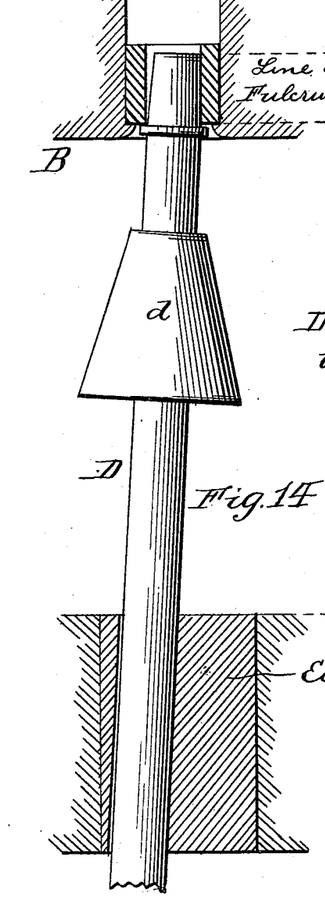
Figs. 14 and 15 are like views showing same results in the use of a movable sleeve having a straight bore and a gyratory shaft having a tapering fulcrum or top part.
Figure 15:
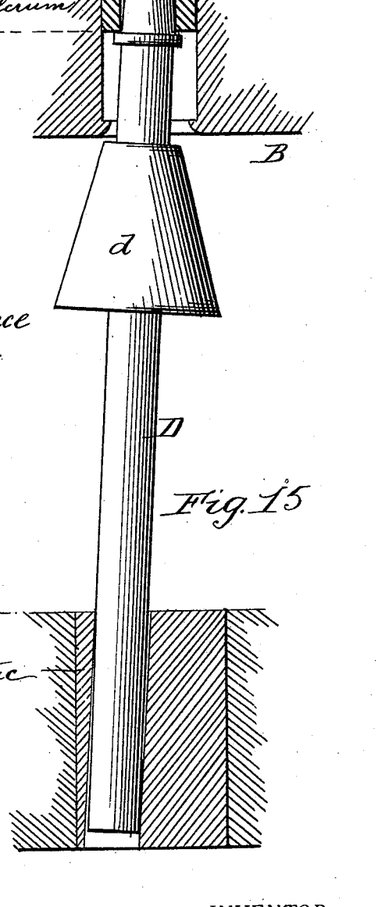
Figures 16, 17:
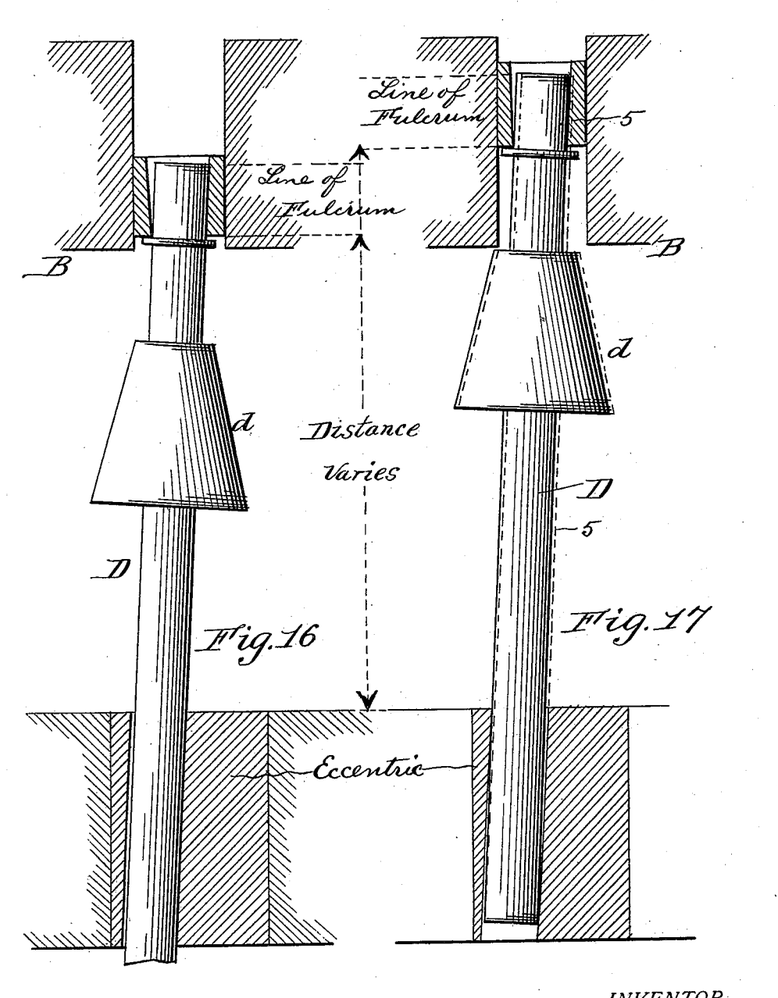
Figs. 16 and 17 are like views showing same results in the use of a movable sleeve having a tapering bore and a gyratory shaft having a cylindrical fulcrum or top part.
Figures 18, 19:
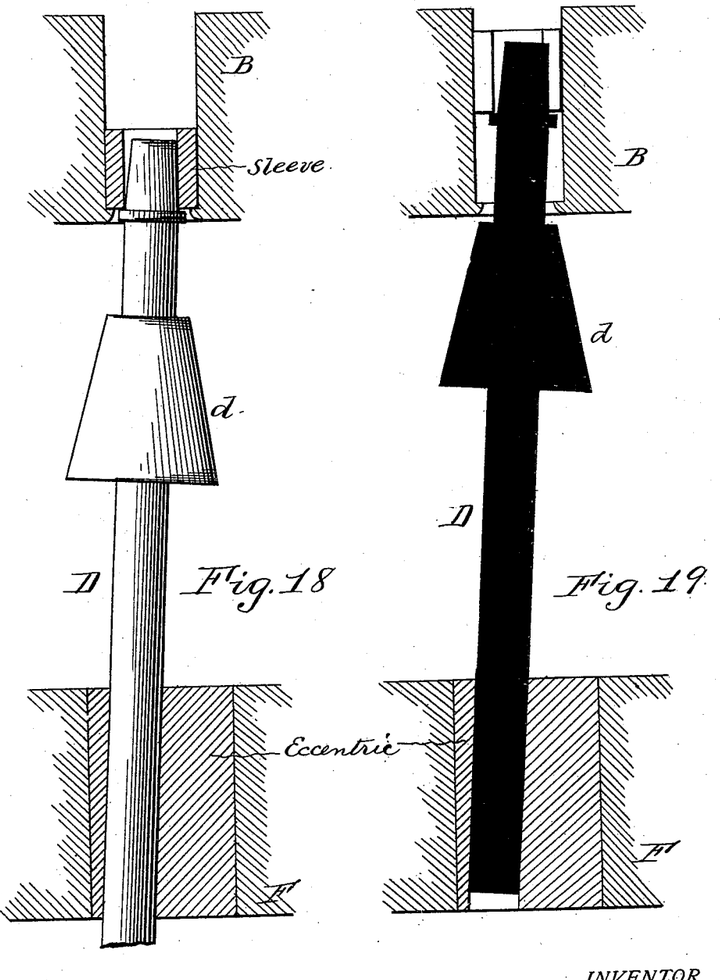
Figs. 18 and 19 are similar views of the construction illustrated in Figs. 14 and 15, except that no play or lost motion is provided in the eccentric bore for the shaft, showing that without this play or lost motion the shaft, when its fulcrum-bearings are made as shown in Figs. 12 to 19, cannot be vertically adjusted.

Again, in the described form of crushing-machines, as well as in all others using a gyratory shaft adjustable vertically for varying the degree of fineness of the crushing, the shaft has been fulcrumed at its upper end in one of the following ways: first, by the well-known ball-and-socket joint; second, by tapering the upper end of the shaft and fitting said end loosely in the cylindrical bore of a fixed or movable sleeve, as indicated in Figs. 12 to 15, inclusive, or, what is practically the same thing, fitting said shaft in a like opening in the top part of the frame of the machine, the sleeve in the latter case being dispensed with, and, third, by tapering the bore of the movable sleeve and making the top of the shaft cylindrical, as indicated in Figs. 16 and 17. The said second and third forms of fulcrum connections are now principally used on account of cheapness of construction and were devised to also obtain parallelism between the contacting side of the shaft fulcrum or journal and its bearing during the gyration of the shaft to secure an effective bearing for sustaining the great resistance offered during the crushing operation. All these described forms of fulcrum-bearing for the gyratory shaft, however, are subject to the disadvantage that whenever the shaft is adjusted vertically for varying the degree of fineness of the crushing the fulcrum of the shaft is either raised or lowered from or to the driving-eccentric, as indicated in Figs. 12 to 17, inclusive, thereby increasing or decreasing the distance between the shaft-fulcrum and the eccentric, which has the effect of changing the angle of the shaft. This alteration in the angle of the shaft whenever it is vertically adjusted causes, first, its lower end to bind in the eccentric bore, as plainly indicated in Figs. 13, 15, and 17, which binding heats the shaft and eccentric until the shaft wears or finds a new bearing in the eccentric corresponding to the altered angle, and, second, the contact side of the fulcrum-journal to tilt out of parallelism with its bearing, as indicated in Figs. 13, 15, and 17. These described results occur even if play or lost motion is provided in the eccentric bore for the shaft, as illustrated in Figs. 12 to 17, inclusive. If the play or lost motion is, however, not provided, the alteration in the angle of the shaft and consequent binding of the shaft prevents any extended vertical adjustment of the shaft, as shown in Figs. 18 and 19.

Another one of the objects of my invention is to avoid altering the angle of the shaft when it is vertically adjusted, and to do this I so construct the shaft-fulcrum and the bearing therefor that the distance between the fulcrum and the driving-eccentric for the shaft remains always the same or never varies, no matter to what extent the shaft may be vertically adjusted, and this I accomplish without necessitating the provision of any play or lost motion in the eccentric for the shaft.

My invention accordingly consists of the combination, construction, and arrangement of parts, as hereinafter described and claimed.

In the drawings, A represents the frame or housing of the machine, of preferably a circular or cylindrical configuration, and is composed of a top plate or section B, having feeding-openings $b$, of crushing-chamber C, having crushing-faces $c$, of gyratory shaft D, having crusher-head $d$, of chute or exit-chamber E, and bottom plate F, having oiling chamber or well G, adjustable bottom $f$, a step-bearing $g$, and toggle or link H between bearing $g$ and the lower end $d'$ of the shaft D, all of which are constructed and arranged for operation except as hereinafter noted, substantially as shown and set forth in a pending application filed by me on the 17th day of September, 1886, and Serial No. 213,795.

Figures 4, 5, 6, 7:
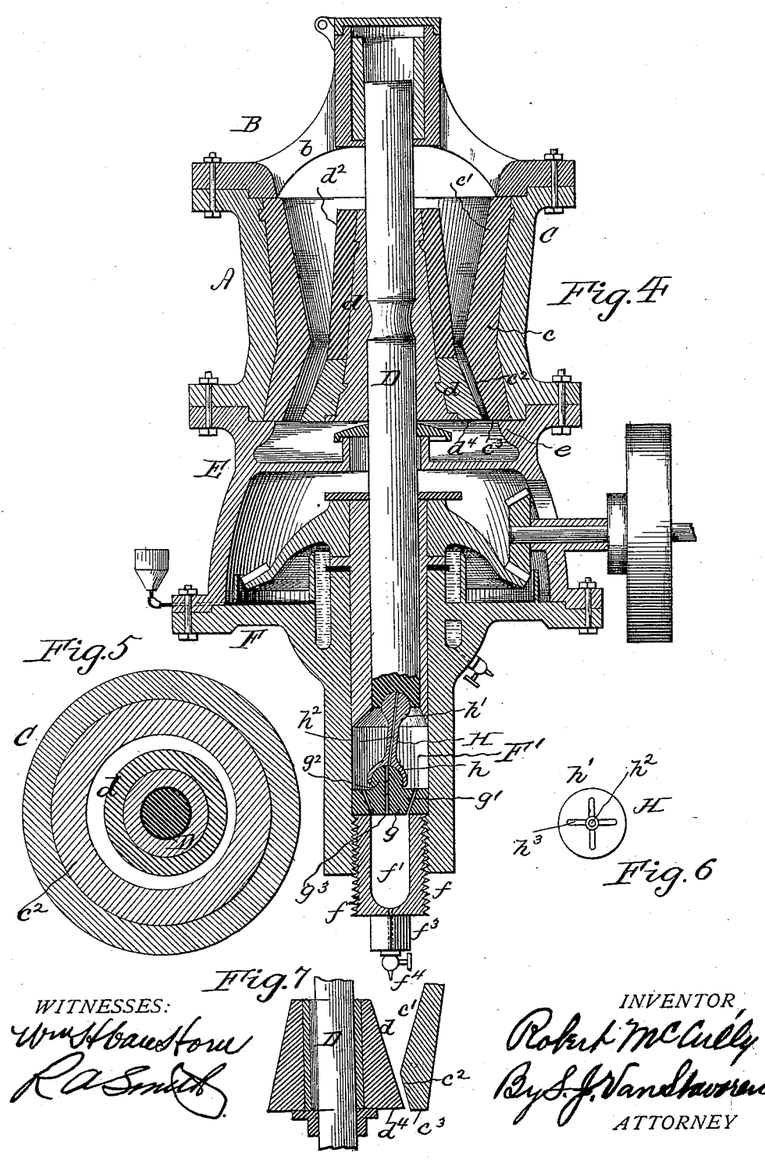
Fig. 4 is a view similar to Fig. 1, showing the crusher-head down to its utmost limit of movement or adjustment to produce the coarsest crushing or work that it is adapted to do.
Fig. 5 is a section on line 1 1, Fig. 1.
Fig. 6 is a plan of the upper ball or head for the toggle or link between the end of the shaft and its step-bearing.
Fig. 7 is a detail sectional view showing crusher-head having a single taper from top to bottom arranged in relation to the crushing-chamber working faces in accordance with my improvements.

The working faces $c$ of the crushing-chamber C are composed of two parts $c'$ and $c^2$, which have reverse tapers—that is to say, the part $c'$ flares outwardly from below upwardly, and it may be in one piece or composed of sections likes the staves of a barrel;

and the part $c^2$ flares outwardly from above and is composed of one piece, or is a ring, as shown more plainly in Fig. 5, and it rests upon an annular ledge or shoulder $e$ at the top of the chute or exit-chamber E. The advantage of making the part $c^2$ in one piece is that it cannot fall out of or be displaced from its position in the machine. In practice I have found that when this ring part $c^2$ is made in sections or staves the crushing pressure wears the adjoining ends of the sections until one or more ultimately work loose and fall out of place and endanger the safety and durability of the machine, and hence if the ring part $c^2$ is in one piece this danger is entirely avoided.

The crusher-head may have reversely-tapered surfaces $d^2$ $d^3$, as shown in Fig. 1, or it may have a single taper from top to bottom, as indicated in Fig. 7. In either case the bottom part $d^3$ of the crusher-head is of greater diameter than its upper part, as illustrated.

The crusher-head and the crushing-chamber working faces $c'$ and $c^2$ are so located relatively to one another that when the crusher-head is adjusted to do the coarsest work possible its lower edge $d^4$ is on a line with or above the lower edge $c^3$ of the working faces $c^2$ of the crushing-chamber C, as indicated in Fig. 4, and when adjusted to do fine work it is raised into the crushing-chamber, as shown in Fig. 1, so that the lower edge $d^4$ of the crusher-head when in action is never below the lower edge $c^3$ of the crushing-chamber. Hence no benches or ledges are ever worn in the lower tapering part $d^3$ of the crusher-head, and it wears evenly and discharges freely at all times.

Figures 8, 9:
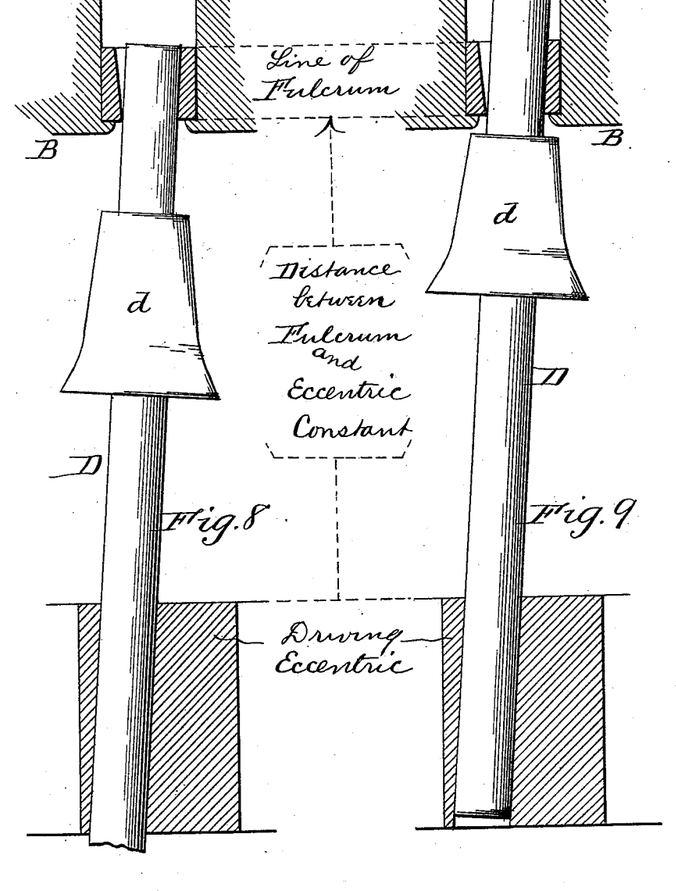
Figs. 8 and 9 are sectional elevations of sleeve-bearing for the top journal or fulcrum of the gyratory shaft, crusher-head on the shaft, and driving-eccentric constructed and arranged for operation in accordance with my invention, showing the shaft in two different positions, and illustrating that when adjusted vertically the distance between its fulcrum-bearing and its driving-eccentric and its angle remains constant.
Figure 10:
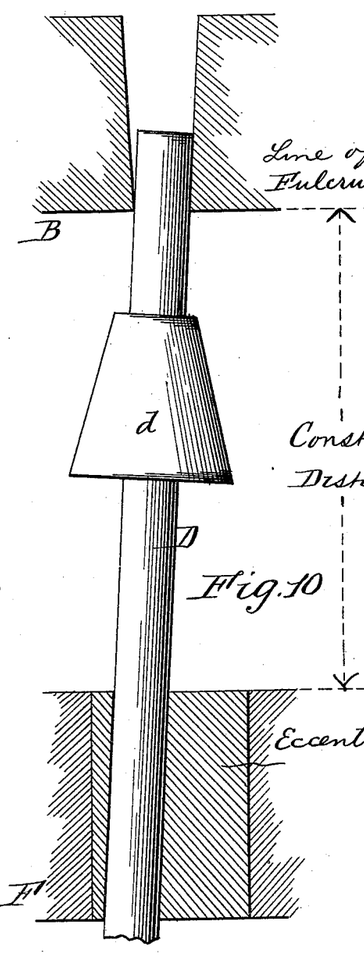
Figure 11:
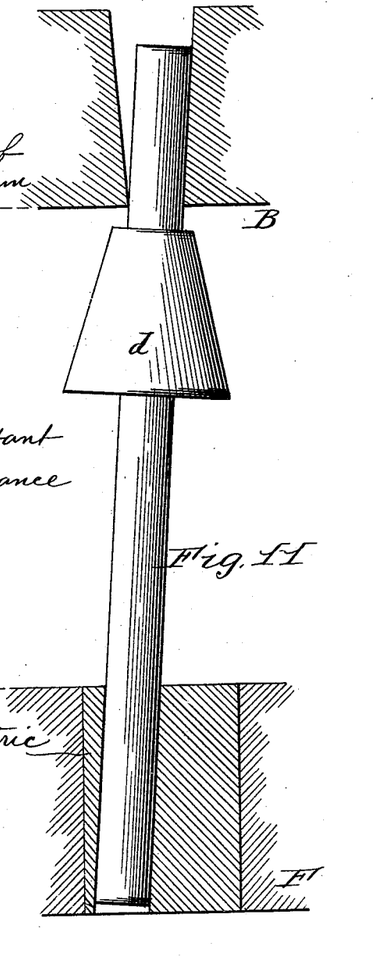
Figure 12:
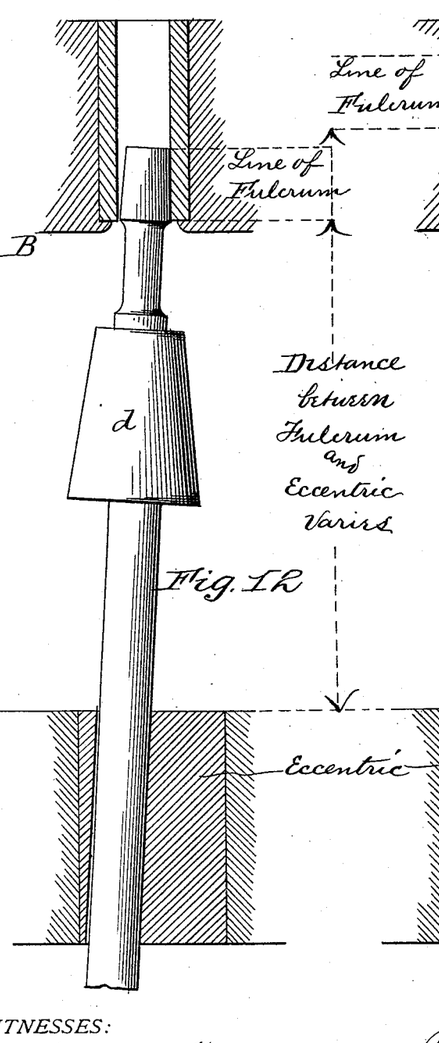
Figs. 12 and 13 are like views of a form of construction of gyratory-shaft fulcrum and its driving-eccentric as heretofore constructed, showing that the distance between the shaft-fulcrum and its eccentric varies and by dotted lines in Fig. 13 that the angle of the shaft changes when the shaft is vertically adjusted.

The upper part of the shaft D is, it will be noted, cylindrical and gyrates in a tapered bore or opening in the top frame of the machine, the diameter of which decreases from above downward. This opening may be in a fixed sleeve in an opening in the top frame of the machine, as more plainly shown in Figs. 8 and 9. The angle or taper of the bore of this sleeve corresponds to the angle or pitch of shaft D, so that the side of its journal or fulcrum contacting with said bore is parallel therewith, as shown in Figs. 1 and 2 and more plainly in Fig. 8. When the shaft is vertically adjusted, said sleeve does not move with the shaft. Hence the fulcrum of the shaft is not raised or lowered from or to the driving-eccentric, but remains constant, and the contact side of the journal remains parallel with said sleeve-bearing, as shown in Fig. 9. Consequently the angle of the shaft is not altered and no consequent binding or heating of the shaft in its eccentric occurs when the shaft is adjusted. This being the case, lost play or motion need not be provided in the eccentric for the shaft, as indicated in Figs. 8 and 9.

In the bottom plate F is a shaft-well F', having an adjustable or screw bottom $f$ for raising and lowering shaft D. This bottom $f$ is tubular, as shown at $f'$, and has a lower closed end $f^2$, which terminates in a turning nut $f^3$, provided, if desired, with a drip-cock $f^4$. The bore $f'$ of the bottom $f$, it will be noted, forms a sediment-chamber for thick oil or other waste from the oil-well above. The sediment-chamber may from time to time be cleaned or emptied by drawing off its contents through cock $f^4$, or the bottom $f$ may be removed from well F' and emptied. At the top of the bore of bottom $f$ is formed a shouldered recess $f^5$, in which is loosely inserted a plate or block $g$, having openings $g'$ for communication between chamber $f'$ and the oil-well above it. Projecting above and from the center of the block or plate $g$ is a hemispherical bearing $g^2$ for a correspondingly-shaped cup or socket $h$ at the lower end of a toggle or loose link H, the upper end of which has a ball $h'$, having a bearing in a socket in the lower end of the shaft D. The block $g$ and adjustable bottom $f$, it will be noted, form an adjustable step-bearing for shaft D, so that it and the crusher-head can be raised or lowered, as desired. Between the shaft and its step-bearing I preferably locate the toggle or link H, for a purpose fully described in said other pending application; but as toggle or link H may, if desired, be dispensed with, I do not confine myself thereto.

To effectually oil the bearings for toggle H, I provide it and the block $g$ with axial oil-channels $h^2$ and $g^3$, respectively, and in the top of the ball end $h'$ of toggle H, I form radial grooves or channels $h^3$, as more plainly shown in Fig. 6. The provision of these oil-channels $h^2$, $g^3$, and $h^3$ facilitate the passage of oil to the bearings of toggle H at all times, and they therefore do not readily heat.

Instead of loosely placing the block $g$ in a shouldered recess at the top of the bore of bottom $f$, it may rest upon the top of the bottom, as shown in Fig. 4; but I do not herein specifically claim this construction, as it forms part of the subject-matter of another pending application filed of an even date herewith, Serial No. 220,331. So, too, in Fig. 4 I have shown the working faces $c'$ and $c^2$ for the crushing-chamber made in one piece and composed of staves or sections; but I do not herein specifically claim the same, as it forms the subject-matter of a separate application filed of an even date herewith, Serial No. 220,330.

I have described my improvements as particularly adapted to a crushing-machine having a gyratory shaft; but as they are applicable with equal advantages to a machine having a rotating shaft, upon which and within the crushing-chamber is an eccentric for operating the crusher-head, and this form of shaft is shown in Fig. 7, it will be noted that the arrangement of the adjustable bottom $f$, step-bearing $g$, and toggle H is such that as the bottom $f$ is adjusted to raise or lower the shaft D the sediment-chamber $f'$ always remains the same distance from the lower end of said shaft. Hence said end of the shaft never at any time passes into the sediment-chamber to rotate or move therein.

In another pending application filed September 17, 1886, Serial No. 213,795, an adjustable screw-bottom for the shaft-well in the bottom plate of the machine is shown; but this is not tubular in the sense expressed in this application, as it merely has an oil-hole in it, which does not serve as a sediment-chamber. The latter in said other application is above the screw-bottom, and such construction is not herein claimed.

In another application filed by me September 17, 1886, Serial No. 213,797, a tubular adjustable bottom for the shaft-well in the bottom plate of the machine is shown; but this adjustable bottom is not a screw-bottom. Hence devices separate from the bottom are shown for adjusting it, and this construction is herein disclaimed.

I do not herein broadly claim the tubular removable and adjustable plug or bottom $f$, as the broad claim therefor forms part of the subject-matter of a companion case filed September 17, 1886, Serial No. 213,797; but what I herein claim is the specific tubular screw bottom or plug.

I do not herein claim, broadly, the toggle H, combined with the end of shaft D, and the adjustable bottom $f$, as the same are broadly claimed in another application filed September 17, 1886, Serial No. 213,795. Neither do I claim said toggle combined with a tubular adjustable bottom $f$, serving as an oil-drip chamber, as the same are broadly claimed in still another pending application filed September 17, 1886, Serial No. 213,797.

What I claim is—

1. In a stone-breaker, the combination of a crushing-chamber having reversely-tapered working faces and a vertically-adjustable gyratory shaft having a driving-eccentric and a crusher-head above said driving-eccentric, the lower crushing-edge of said head being always within the bottom edge of the crushing-chamber when in action, substantially as set forth.

2. In a crushing-machine, the combination of a vertically-adjusted shaft D, having a cylindrical upper end, and a crusher-head provided with differently-tapered working faces, a driving-eccentric for said shaft, a frame having a crushing-chamber provided with reversely-tapered working faces, and a tapered opening in its top part B, decreasing in diameter from above, corresponding to the angle or pitch of the shaft D, whereby it is vertically adjustable without altering its pitch or angle, substantially as set forth.

3. In a crushing-machine, the combination of a fixed crushing-chamber, gyratory shaft D, having a crusher-head, a driving-eccentric for said shaft, bottom plate F, having well F', an adjustable tubular screw-bottom $f$ in said well, and toggle or knuckle H, substantially as and for the purpose set forth.

4. In a crushing-machine, the combination of bottom plate F, having well F', shaft D, adjustable tubular screw-bottom $f$, having a separate step-bearing at its top, toggle or knuckle H, a cock $f^4$, and turning nut $f^3$ at its bottom, substantially as set forth.

5. In a crushing-machine, the combination of shaft D, bottom plate F, having well F', adjustable tubular screw-bottom $f$, having in its bore near its top a shoulder $f^5$, a loose block or step-bearing $g$, resting upon said shoulder, and toggle or knuckle H, substantially as set forth.

6. The combination, with the bottom plate F and shaft D, of the toggle H, having oil-channels $h^2$ $h^3$, and step-bearing $g$, having channels $g'$ and $g^3$, and an adjustable bottom $f$, substantially as set forth.

7. In a crushing-machine, the combination of a vertically-adjustable gyratory shaft having a cylindrical upper end, a driving-eccentric for said shaft, and an opening or bearing for the upper end of the shaft, having a taper or inclination corresponding to the pitch or angle of the shaft, whereby the shaft is adjusted vertically without changing its angle or pitch, substantially as set forth.

8. In combination in a crushing-machine, a vertically-adjustable gyratory shaft having a cylindrical upper end, a frame having in its upper part a fixed sleeve provided with an opening or bearing having a taper or inclination corresponding to the pitch or angle of the shaft, and driving mechanism for the shaft, substantially as set forth.

9. In a crushing-machine, the combination of a gyratory shaft, an upper bearing, and an eccentric driving bearing for the lower end of the shaft, both of which bearings are inclined or tapered to correspond to the angle or pitch of the shaft, substantially as set forth 10. The combination of a crushing-chamber, a driving-eccentric having an oblique opening, an adjustable gyratory shaft having a crusher-head and its lower end fitting said opening in the eccentric, and a fulcrum or upper bearing for said shaft, the relative position of which to the eccentric is unchangeable when the shaft is adjusted, substantially as set forth.

11. The combination of a crushing-chamber, an eccentric having an oblique opening, an adjustable gyratory shaft having a crusher-head, and a fulcrum for said shaft, the relative position of which to the eccentric is unchangeable when the shaft is adjusted, substantially as set forth.

In testimony whereof I affix my signature in presence of two witnesses

ROBERT McCULLY.

Witnesses:
S. J. VAN STAVOREN,
CHAS. F. VAN HORN.